W. L. BURNER, J. H. COTTON AND A. D. BOOTH.
DUMP CAR.
APPLICATION FILED NOV. 16, 1918.

1,330,978.

Patented Feb. 17, 1920.
3 SHEETS—SHEET 1.

William L. Burner
James H. Cotton
Augustus D. Booth INVENTORS.
BY
Geo. W. Rightmire ATTORNEYS.

W. L. BURNER, J. H. COTTON AND A. D. BOOTH.
DUMP CAR.
APPLICATION FILED NOV. 16, 1918.

1,330,978.

Patented Feb. 17, 1920.
3 SHEETS—SHEET 2.

William L. Burner
James H. Cotton  INVENTORS.
Augustus D. Booth
BY
Geo. W. Rightmire ATTORNEYS.

W. L. BURNER, J. H. COTTON AND A. D. BOOTH.
DUMP CAR.
APPLICATION FILED NOV. 16, 1918.
1,330,978.
Patented Feb. 17, 1920.
3 SHEETS—SHEET 3.
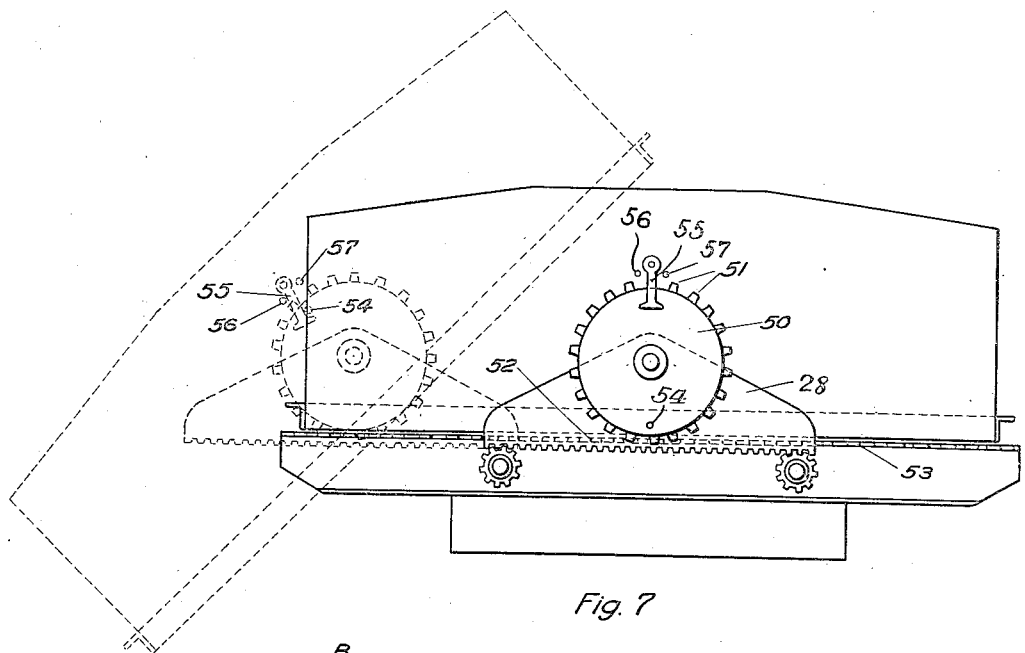
Fig. 7
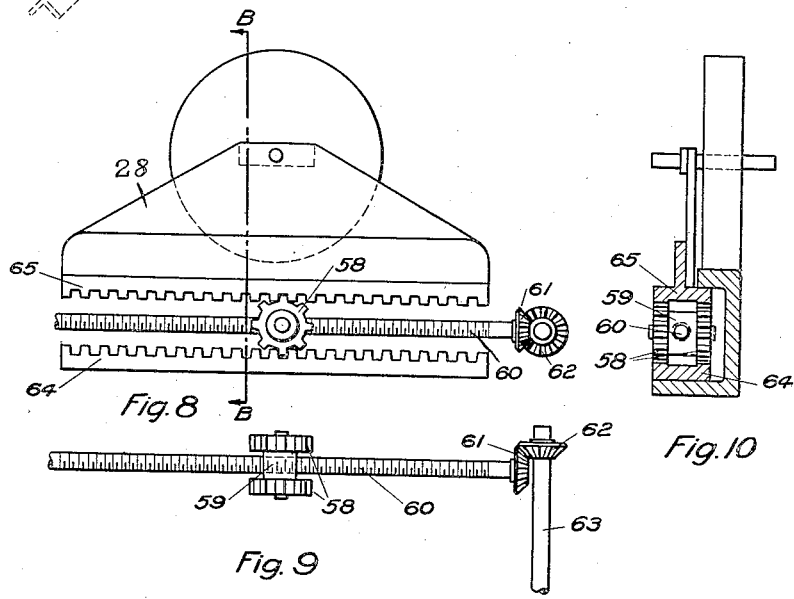
Fig. 8
Fig. 9
Fig. 10
William L. Burner
James H. Cotton
Augustus D. Booth
INVENTORS.
BY
Geo. W. Rightmire ATTORNEYS.

UNITED STATES PATENT OFFICE.

WILLIAM L. BURNER, JAMES H. COTTON, AND AUGUSTUS D. BOOTH, OF COLUMBUS, OHIO, ASSIGNORS TO THE KILBOURNE AND JACOBS MANUFACTURING COMPANY, OF COLUMBUS, OHIO, A CORPORATION OF OHIO.

DUMP-CAR.

1,330,978.   Specification of Letters Patent.   Patented Feb. 17, 1920.

Application filed November 16, 1918. Serial No. 262,818.

*To all whom it may concern:*

Be it known that we, WILLIAM L. BURNER, JAMES H. COTTON, and AUGUSTUS D. BOOTH, citizens of the United States, residing at Columbus, in the county of Franklin and State of Ohio, have invented certain new and useful Improvements in Dump-Cars, of which the following is a specification.

This invention relates to improvements in dump cars and is intended to accomplish the tilting of the car body at either side of the vehicle. The body is mounted on carrying wheels preferably at its ends, and these wheels are borne on tracks laid transversely of the underframe; when power is applied to the wheels the body moves laterally over the tracks to a proper dumping position at one side or the other of the underframe. The body is supported also by an intermediate wheel or roller and mainly through the latter is the tilting of the body and the dumping of the load effected. Also the car door operating mechanism is so constructed that it is carried with the body and tilted therewith to bring the door to the open position at the right time. The chief features of the invention are the provision for moving the bar body laterally on the vehicle underframe, for tilting the body to a dumping position and for righting the same, and associating these mechanisms with a door operating mechanism carried on the body and movable therewith from side to side of the vehicle.

Figure 1:
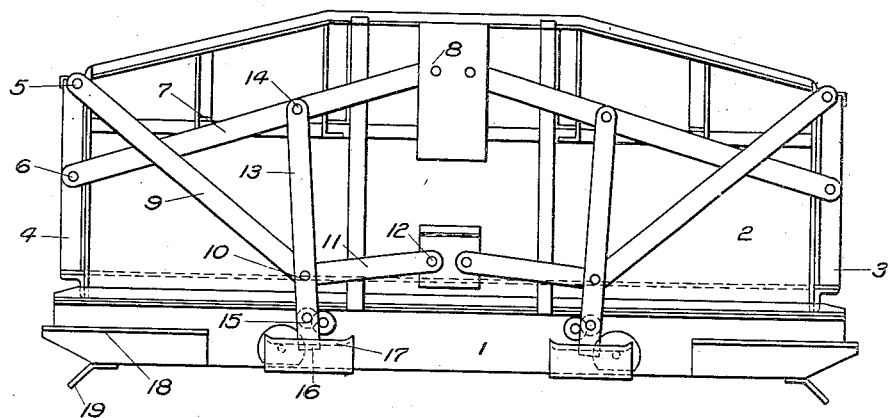
Figure 2:
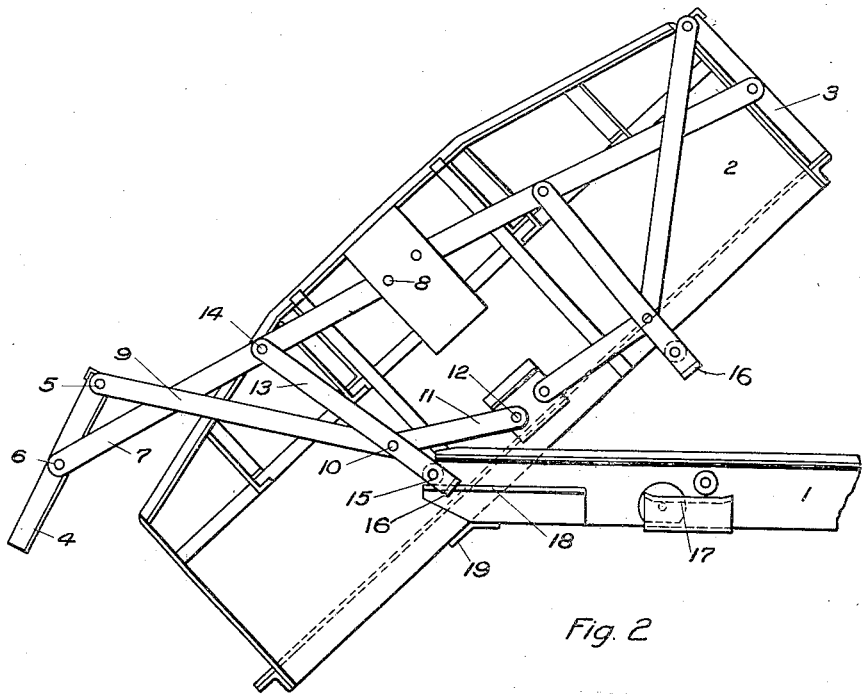
Figures 3, 5:
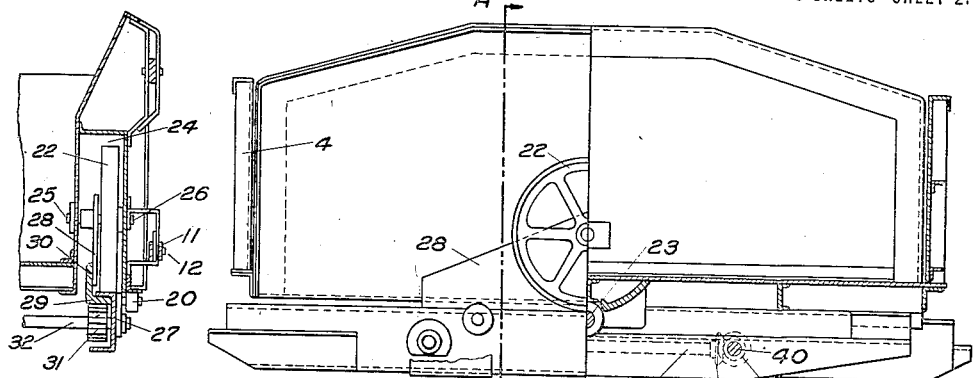
Figure 4:
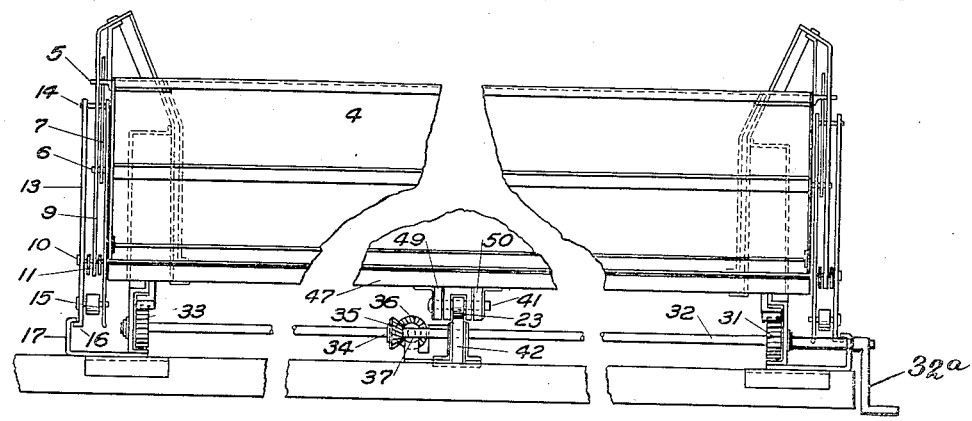
Figure 6:
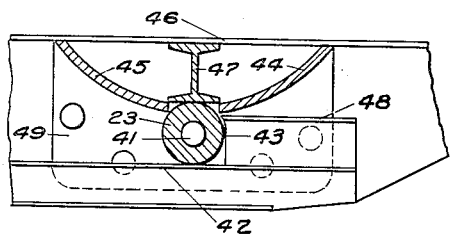

In the drawings which are hereto attached and hereby made part of this specification, Figure 1 is an end view of the car body illustrating the door operating mechanism and Fig. 2 shows the operation of said mechanism during the dumping of the body; Fig. 3 shows the car body with the door operating mechanism removed to illustrate the mounting of the end carrying wheel, the body being in partial section to show the intermediate carrying roller and the rocker member adjacent thereto to assist in the dumping; Fig. 4 is a side elevation of the car near one side thereof to show the door operating mechanism and the body carrying and actuating devices; Fig. 5 is a section along the line A—A of Fig. 3 to show the mounting of the end carrying wheel and a portion of the operating mechanism for moving the body laterally; Fig. 6 is a section to illustrate the intermediate carrying roller at the limit of its travel, the shoulder formed on the track for said roller and the rockers formed on the car body adjacent the wheel for assisting the dumping and righting operation; Fig. 7 is a modified construction of the carrying wheel at the end of the body and the body tilting means therefor; Fig. 8 is a modified construction wherein one operating gear or pinion is employed at each end of the frame, so constructed that the gear travels laterally in performing its work; Fig. 9 is a plan view of the gear and actuating means therefor shown in Fig. 8; Fig. 10 is a section through the construction of Fig. 8 along the line B—B to show the mounting of the gear or pinion wheel.

Referring to the drawings in which the same numeral is used to indicate the same part throughout, the truck or wheel supports for the underframe and car body are not shown, inasmuch as they are of well known constructions, and for this purpose the car body may be mounted upon a power vehicle, either gas or steam or otherwise moved, or upon a trailer truck, or upon the usual railroad truck; in any of these constructions the functions and operation of the parts under consideration are substantially as here shown and described.

The underframe is shown at 1 upon which is tiltably mounted the body 2; the doors are shown at 3 and 4 the latter being pivoted at 5 to swing outwardly; it is also pivoted at 6 on the end of the bar 7 pivoted at its other end at 8 on the body 2. Bar 9 is pivoted at 10 in connection with bar 11, the latter being pivotally mounted upon the car body at 12. The bar 13 is pivotally mounted at 14 on the bar, and at 10 is associated with bars 9 and 11, carries the roller 15 thereon, and at its free end is hooked at 16 to engage the bent member 17 mounted on the underframe 1, thereby preventing undesired movement of the door when the truck is in transit. A similar construction is provided for door 3.

The body being moved laterally as appears in Fig. 2 the hook 16 passes out of engagement with the member 17, leaving the door free to respond to the tilting impetus imparted at the limit of its lateral movement. The operation of the door manipulating apparatus is apparent in Fig. 2, the bar or prop 13 operating to hold aloft the door by engagement with member 18; as the body swings downwardly it is limited by the bent member 19 mounted on the underframe. It is seen that the door actuating apparatus is carried bodily on the body of the car and is admirably adapted to a laterally movable and tiltable body.

The body is supported preferably by one wheel at each end thereof as appear at 22 in Fig. 3, the opposite end being supported identically; considerable support is also provided by the intermediate wheel or roller 23. The wheel 22 is contained in the housing 24 and has its bearings in the end frame of the car body at 25 and in the housing at 26; the track for the wheel is in this instance formed of the channel 27 arranged transversely on the underframe. The bracket member 28 is carried on the shaft near the inner bearing 25 of the wheel and carries on its lower edge the rack 29 formed on the angle 30.

The gear or pinion 31 mounted on the shaft 32 meshes with the rack 29 to drive the latter; the shaft 32 extends from one end of the underframe to the other as appears in Fig. 4, and carries at its opposite end the pinion 33 mounted and operating identically and for the same purpose as pinion 31. The operating means for this shaft shown here is a conventional crank 32ª, but any well known means may be utilized and it is not deemed necessary to exhibit alternative means. At 34 on the shaft 32 is mounted the bevel pinion 35 adapted to mesh with the bevel gear 36 on the transverse shaft 37 which at its other end carries a like bevel pinion 38 meshing with a bevel gear 39 on a second operating shaft 40 which carries at its ends pinions corresponding to pinions 31 and 33 above. The transverse shaft 37 with its bevel connections harmonizes the movements of the operating shafts in their function of impelling the body laterally on the underframe to its dumping position and back to the normal carrying position.

The intermediate wheel or roller 23 is mounted on the under face of the body by means of the pin 41 and bears on the track 42 mounted transversely on the underframe; this roller is adapted to carry much of the weight of the loaded body and at the extremities of its travel it contacts with a shoulder 43 formed on the track 42 and bears thereagainst to cause the car body to tilt to its dumping position under the propulsion of the rack and pinion construction actuating the end wheels laterally. To assist in the dumping movement the rockers 44 and 45 are formed on the under face 46 of the body and associated with the I-beam 47 forming a part of the frame work of the body of the car. As the body is tilted the rocker 44 bears upon the surface 48 and renders the dumping gradual and also assures the return of the body to horizontal position after the lading is discharged. The rocker 45 performs a like function when the dumping takes place at the opposite side of the car. The bracket for mounting the roller 23 appears at 49 and 50.

With the construction thus far described the car body is moved on tracks from one side to the other of the underframe by power applied to the end carrying wheels through their pivots or bearings, the body is brought to a dumping position by the engagement of the intermediate bearing roller with an obstruction formed in its path, and the dumping operation is controlled and the righting operation is assured by means of a rocker construction formed adjacent the intermediate bearing roller. The power is applied through the longitudinal shaft construction, the transverse shaft keeping the longitudinal shafts in harmonious operation; the use of the two shafts makes it possible to employ a short rack which could not be done with a single pinion located centrally unless two end wheels associated in a pair were used, but we prefer the single end wheel as shown. Along with the constructions described we employ a car door operating construction carried entirely on the body and actuated at the limit of lateral travel of the body by engagement with the underframe of a depending prop member carried on the body; it is evident that any permanent connection between the door operating means and the underframe would render the structure useless on a car of the kind herein shown.

Various modifications of the construction may be made and in Fig. 7 we show an end carrying wheel 50 having teeth 51 on its periphery adapted to mesh with perforations 52 in the track 53; the pin 54 on the face of the wheel is adapted to engage the swinging member 55 carried on the body depending between the stops 56 and 57; thereupon further movement of the wheel operates to tilt the body as shown in Fig. 7, the teeth on the wheel preventing slipping thereof while the dumping and righting are taking place. The mounting of the wheel and the actuating thereof are the same as described above for the construction disclosed in the preceding drawings.

Another form is shown in Figs. 8, 9, and 10, wherein a double pinion 58 is employed, carried by the traveling block 59 actuated by the screw 60, the latter operated through a pair of bevel gears 61 and 62 by the actuation of the shaft 63 in any preferred manner. In this form the double pinion in mesh with the rack 64 stationary on the underframe and with the rack 65 carried on the body in the manner above described moves the body with double speed and only one double pinion at each end of the car is required. A single operating shaft is sufficient also. The end wheel and the construction for mounting the same are, as above described, shown in Fig. 5.

What we claim is:—

1. A dump car having an underframe with transverse tracks thereon, a body, a wheel mounted for movement upon each end of said body to support the same and bearing upon a track, means for applying the motive power to the shaft of said wheel to give said body a lateral horizontal movement, an intermediate roller or wheel supporting said body and bearing upon one of said transverse tracks, and means coöperating with said intermediate roller to cause said body to be tilted to discharge the lading at one side of said car.

2. A dump car having an underframe with transverse tracks thereon, a body, a wheel at each end of said body adapted to support the same and bearing upon one of said tracks, a bracket or frame rigidly depending from the shaft of said wheel, means for applying the motive power to said bracket to give said wheel and consequently said body a lateral horizontal movement, an intermediate roller or wheel supporting said body and bearing upon one of said transverse tracks, and means coöperating with said intermediate roller to cause said body to be tilted to discharge the lading at one side of said car.

3. A dump car having an underframe with transverse tracks thereon, a body, a wheel at each end of said body adapted to support the same and bearing upon one of said tracks, a bracket or frame rigidly depending from the shaft of said wheel, a rack formed on said bracket, a pinion engaging said rack, and means for actuating said pinion to give said body a lateral horizontal movement, and means for dumping said body when the limit of lateral movement desired has been reached.

4. A dump car having an underframe with transverse tracks thereon, a body, end supporting wheels for said body mounted for movement upon said tracks, an intermediate wheel or roller mounted upon said body to support the same and bearing upon one of said tracks, an obstruction upon said last mentioned track with which said roller is adapted to engage, means for propelling said body horizontally in a lateral direction and by said engagement to effect the dumping of the said body, and means on the under face of said body adjacent said roller adapted to engage the said obstruction to cause said body to return to its horizontal position after being dumped.

5. A dump car having an underframe with transverse tracks thereon, a body, supporting wheels therefor mounted at the ends of said body on said tracks, a depending bracket rigidly associated with the shaft of each of said wheels, and having a short rack formed thereon, and a pair of spaced shafts extending longitudinally of said underframe and adapted to actuate said racks.

6. A dump car having an underframe with transverse tracks thereon, a body, supporting wheels therefor mounted at the ends of said body upon said tracks, a depending bracket rigidly associated with the shaft of each of said wheels, a short rack formed upon said bracket, a pair of spaced shafts extending longitudinally of said underframe and adapted to actuate said racks, and means for compelling the harmonious coöperating movement of said shafts.

7. A dump car having an underframe with transverse tracks thereon, a body mounted for movement laterally on said tracks to either side of said frame for dumping, displaceable sides for said body, folding or collapsing mechanism for manipulating said sides mounted upon said body and movable laterally therewith to dumping position, and means carried upon said underframe with which said mechanism is brought into engagement when said body is being tilted to its dumping position whereby said sides are held aloft to permit the discharge of the lading.

8. In a side dump car having displaceable sides and transverse tracks mounted on its underframe, carrying wheels for the car body mounted to travel on said tracks and to move said car body to either side of the underframe for dumping, a rack borne upon the shaft of each of said carrying wheels, gear means for actuating said racks to move said car body to and from dumping position, means for actuating said gear means, a folding structure carried upon either end of the car body connected with the ends of said displaceable sides, and means connected with said structure adapted to engage the underframe of said car when said car body is dumped to hold said displaceable sides aloft.

9. In a dump car, an underframe having transverse tracks thereon, a car body supported on end carrying wheels mounted on said tracks for movement to one side or the other of said underframe for dumping, an intermediate carrying roller mounted on the under face of said car body, transversely arranged rockers mounted on the under face of said car body adjacent to said roller, a track on said underframe for said roller, a shoulder formed on said track at each end thereof arranged to stop the lateral movement of said car body and to cause the dumping movement to be initiated, said rocker thereupon coming into engagement with the upper surface of said shoulder and aiding the dumping and righting movement of the car body.

In testimony whereof we affix our signatures in the presence of two witnesses.

WILLIAM L. BURNER.
JAMES H. COTTON.
AUGUSTUS D. BOOTH.

Witnesses:
 H. A. GARDNER,
 J. W. KIRKER.